S. Heywood,
Sawing Shingles,

N° 39,046. Patented June 30, 1863.

Witnesses:
J.W. Coombs
G.W. Reed

Inventor:
Simeon Heywood
per Munn & Co
attorneys

UNITED STATES PATENT OFFICE.

SIMEON HEYWOOD, OF CLAREMONT, NEW HAMPSHIRE.

IMPROVED SHINGLE-MACHINE.

Specification forming part of Letters Patent No. 39,046, dated June 30, 1863.

*To all whom it may concern:*

Be it known that I, SIMEON HEYWOOD, of Claremont, in the county of Sullivan and State of New Hampshire, have invented a new and Improved Shingle-Machine; and I do hereby declare that the following is a full, clear, and exact description of the same, reference being had to the accompanying drawings, making a part of this specification, in which—

Figure 1:
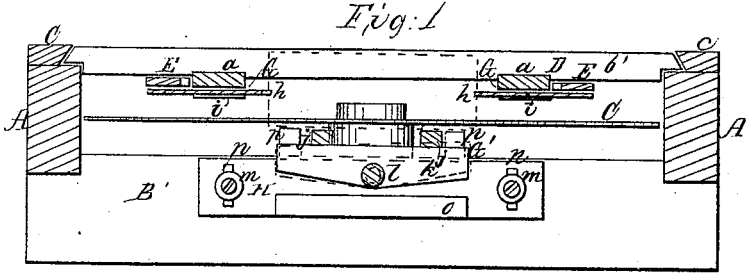
Figure 2:
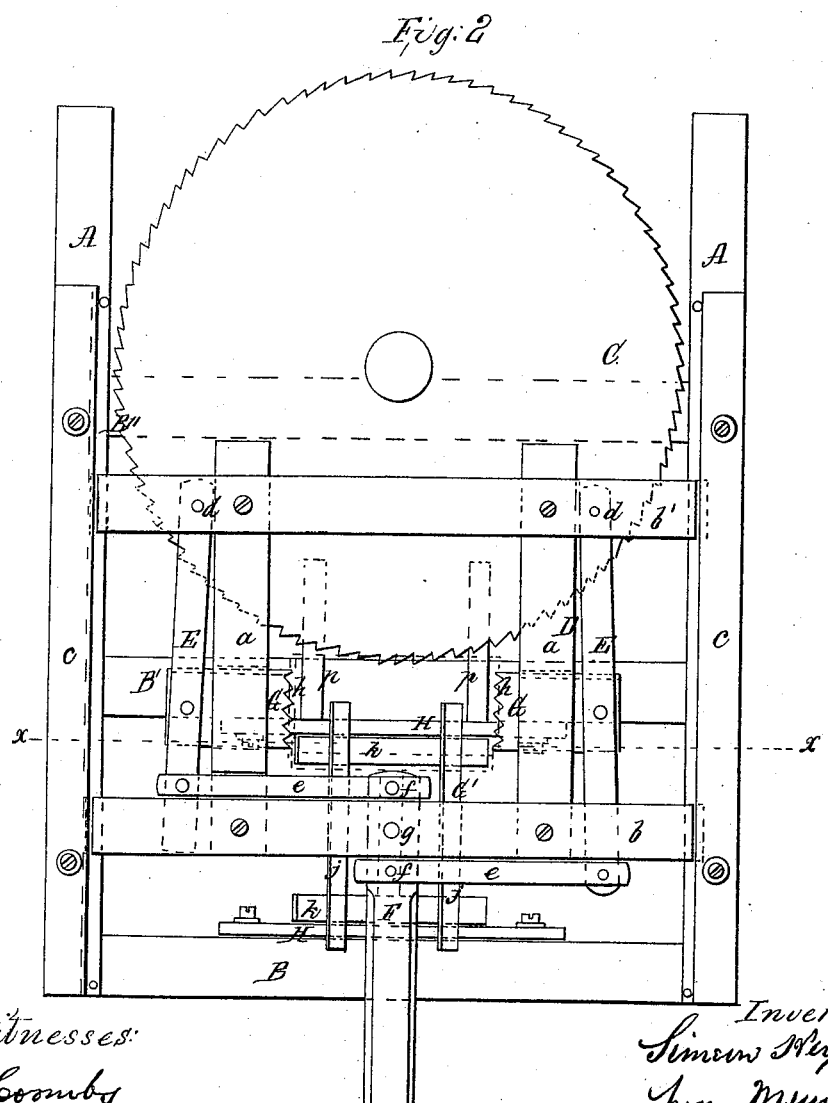

Figure 1 is a vertical section of my invention, taken in the line $x\,x$, Fig. 2. Fig. 2 is a plan or top view of the same.

Similar letters of reference indicate corresponding parts in the two figures.

This invention relates to an improved shingle-machine of that class in which a circular saw is employed for cutting the shingles from the bolt.

The invention also consists in the employment or use of supporting-bars, so arranged relatively with the saw and the bed on which the bolt is moved and adjusted that the shingle while being cut from the bolt will be sustained or held in proper position and a clean smooth cut obtained the whole width of the bolt.

The invention further consists in using, in connection with the saw-supporting bars and the clamps or dogs, a tilting bed, arranged in such a manner as to admit of the bolt being very readily adjusted to have the saw cut the shingles in proper taper form.

To enable those skilled in the art to fully understand and construct my invention, I will proceed to describe it.

A A represent two parallel bars, which are connected together by traverse-bars B B′ B″, the latter having an upright arbor attached to it, on which a circular saw, C, is placed.

D is a rectangular frame, composed of two parallel longitudinal bars, $a\,a$, permanently secured to parallel cross-bars $b\,b'$. This frame B has the ends of its cross-bars $b\,b'$ fitted between guides $c\,c$, which are attached longitudinally to the upper surfaces of the bars A A. The frame D is above the level or plane of the saw C, and is allowed to slide freely forward and backward on the bars A A.

To the inner cross-bar, $b$, of the frame D, there are attached two levers, E E, by fulcrum-pins $d\,d$. These levers are at the outer sides of the bars $a\,a$ of the frame D, and they extend, one nearly to the outer cross bar, $b$, and the other beyond it, and are connected to two arms, $e\,e$, one at each side of said bar, as shown in Fig. 2. The arms $e\,e$ at their inner ends are connected by pivots $f$ to a lever, F, which is attached by a fulcrum-pin, $g$, to the center of the outer cross-bar, $b$, of the frame D, and serves as a handle for the same, and the arms $e\,e$ are attached to the lever or handle F at opposite sides of its fulcrum-pin $g$, as shown clearly in Fig. 2.

To each lever E there is permanently secured a clamp or dog, G, formed of a flat metal plate serrated or toothed at its outer edge, as shown at $h$, Fig. 2. These clamps or dogs project from the inner sides of the levers E at right angles, and work in grooves or recesses $i'$ in the bars $a\,a$ of the frame D, said grooves or recesses serving as guides for the clamps or dogs. (See Fig. 1.)

G′ is a tilting bed, which is formed of two parallel bars, $j\,j$, attached to parallel cross-bars $k\,k$, which are secured on a shaft, $l$, the journals of which are fitted loosely in bearings in bars H H, which are attached to the inner sides of the traverse-bars B B′ by set-screws $m$, passing through oblong vertical slots $n$ in the bars H, and into the traverse-bars B B′, as shown in Fig. 1. By unscrewing the set-screws $m$ the bars H H may be adjusted higher or lower, as desired. The shaft $l'$ is allowed to turn freely in its bearings, and the under surfaces of the bars $k\,k$ on said shaft are beveled upward from their center outward, as shown in Fig. 1, and are directly over cleats $o$ on said bars H. These beveled surfaces of the bars $k\,k$ admit of the bed G′ tilting a certain distance, either to the right or left. The bars $j\,j$ of the tilting bed G′ are parallel with the bars A A, as shown in Fig. 2, and to the upper surface of the traverse-bar B′ there are attached two parallel bars, $p\,p$, which extend underneath the saw C a suitable distance, as shown by the dotted lines in Fig. 2.

The operation is as follows: The saw C is rotated by any convenient power, and the bolts from which the shingles are cut are gotten out of the proper dimensions and of rectangular form. The frame D is drawn backward to its fullest extent, and the two clamps or dogs G G forced apart by actuating the handle or lever F and the bolt (shown in red outline) is placed on the tilting bed G′, the latter being tilted to one side, and the lever or handle F actuated or turned so as to force the clamps or dogs into the ends of the bolt. The operator then shoves the frame D forward toward the saw by means of the lever or handle F, the frame D carrying the bolt with it and to the saw, and the latter cutting the shingle from the under side thereof. The bars $p\ p$ hold or sustain the shingle while being cut, preventing it from breaking off from the bolt and leaving a strip on the latter. The inclination of the bed G' causes the shingles to be cut in taper form, and this bed is tilted consecutively in reverse positions at the termination of each backward movement of frame D, in order that the points and butts of the shingles may be cut alternately from either end of the bolt, the bolt being released from the clamps or dogs in order that it may fall on bed G' after the latter is tilted. The bed G' may be tilted by the direct application of the hand or a treadle, or other mechanical means may be applied to it for the purpose.

The thickness of the shingles may be graduated as desired by adjusting the bars H H higher or lower. By this arrangement of the levers E, arms $e\ e$, and lever or handle F, as shown, the clamps or dogs and the frame D may be operated through the medium of said lever or handle alone.

I do not claim the tilting bed G' separately or in itself considered, for that is an old and well-known means for giving the taper cut to the bolt; but,

Having thus described my invention, what I do claim as new, and desire to secure by Letters Patent, is—

The combination of the bevel tilting bed G', shaft $l$, and supporting-bars $p$ with the adjustable bars H, reciprocating frame D, levers E F, dogs G, and saw C, in the manner and for the purpose herein shown and described.

SIMEON HEYWOOD.

Witnesses:
    EDWARD D. BAKER,
    GEO. B. HEYWOOD.